M. Ludwig,
Drag Saw.

Nº 13,277.          Patented July 17, 1855.

UNITED STATES PATENT OFFICE.

MATTHEW LUDWIG, OF BOSTON, MASSACHUSETTS.

MACHINE FOR SAWING DOWN TREES.

Specification of Letters Patent No. 13,277, dated July 17, 1855.

*To all whom it may concern:*

Be it known that I, MATTHEW LUDWIG, of Boston, in the county of Suffolk and State of Massachusetts, have invented a new and Improved Machine for Sawing Down Standing Trees and also for Sawing Down Firewood; and I do hereby declare that the following is a full, clear, and exact description of the same, reference being had to the annexed drawings, making a part of the specification, in which—

Figure 1:
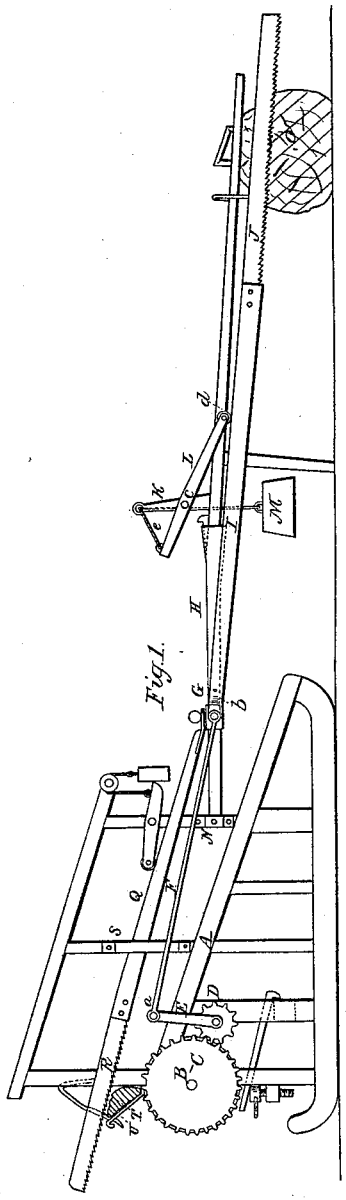
Figure 2:
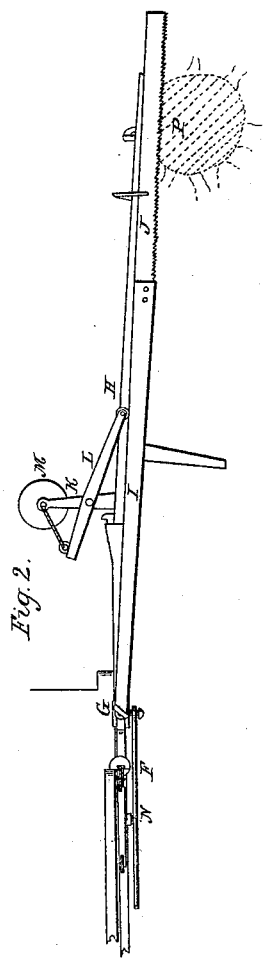

Figure 1, is a side view of my improvement. Fig. 2, is a plan or top view of the saw attachment shown in a different position to that shown in Fig. 1.

Similar letters of reference indicate corresponding parts in the two figures.

A, Fig. 1, represents a suitable framing on which the ordinary inclined horse power is placed, or the horse power formed of an inclined endless belt working friction rollers.

B, represents the shaft of the upper roller of the endless belt having on one end a toothed wheel C, which gears into a smaller toothed wheel D, the axis of which is attached to the framing A. The toothed wheel D, has a crank arm E, attached to it. To the end of the crank arm there is attached by a pivot (*a*) one end of a connecting rod F. The opposite end of this connecting rod is attached by a screw (*b*) to a sleeve G. The sleeve G, is of rectangular form and is fitted loosely on a rectangular bar H, one end of which is secured to the framing A. The opposite end of the bar H, is attached to the log or to the standing tree to be sawed down, as will be presently shown.

I, represents a bar, one end of which is attached to the sleeve G, and the opposite end is attached to a saw J.

To the bar H, there is attached an arm K, which has a lever L, secured to it by a screw or pivot (*c*). The inner end of this lever L, is provided with a friction roller (*d*) which bears against the bar I, and the opposite end of the lever has a cord (*e*) attached to it, said cord passing through a hole in the outer end of the arm K, and having a weight M, attached to its lower end. The inner end of the bar H, is fitted in a socket N, attached to the framing A, so that said bar may be detached from the frame and turned or reversed. This will be hereafter alluded to.

If logs are to be sawed for fire wood, see Fig. 1, the outer end of the bar H, is clamped in any proper manner to the log, represented by O, the log being in a horizontal position. In this case the arm K, is in an upright position and the friction roller (*d*) of the lever L, bears upon the bar I, and consequently keeps the saw to its work. The reciprocating motion of the saw is produced by means of the revolution of the crank arm E, the sleeve G, working back and forth on the bar H.

In order to saw down standing trees, the bar H, is withdrawn from the socket N, turned and replaced in the socket. In this case the bar I, and saw J, rest upon the bar H, see Fig. 2, but the friction roller of the lever L still bears against the bar I, and keeps the saw to its work, the saw, of course cutting in a horizontal direction. The outer end of the bar H, is clamped to the side of the tree P, which is shown in red, in Fig. 2. In order to resaw the wood into short lengths, another bar Q and saw R, may be attached to the sleeve G, see Fig. 1, the bar Q working in a suitable guide S, attached to the framing A. The logs represented by T, while being sawed, may rest in suitable hooks V, at the front of the framing A.

The above invention is extremely simple and useful for farmers and others and may be cheaply constructed.

Having thus described my invention, what I claim as new and desire to secure by Letters Patent, is,

Attaching the connecting rod F, to a sleeve G, which works upon a bar H, attached to the framing A, the bar I, of the saw J, being attached to the sleeve G, and the bar H, having an arm K, attached to it, which arm has a lever L, attached, one end of which is provided with a friction roller which bears against the bar I, and keeps the saw to its work, in consequence of the cord (*e*) and weight M, attached to the opposite end, the bar H, being arranged as herein shown, so that it may be turned and allow the saw J, to cut in a vertical or horizontal position.

MATTHEW LUDWIG.

Witnesses:
A. B. ELY,
W. A. HARRINGTON.